Feb. 14, 1956 W. BAILEY 2,734,573
MACHINE FOR CUTTING OFF THE END TURNS OF THE
COILS OF ELECTRICAL MACHINE ELEMENTS
Filed Oct. 5, 1951 2 Sheets-Sheet 1
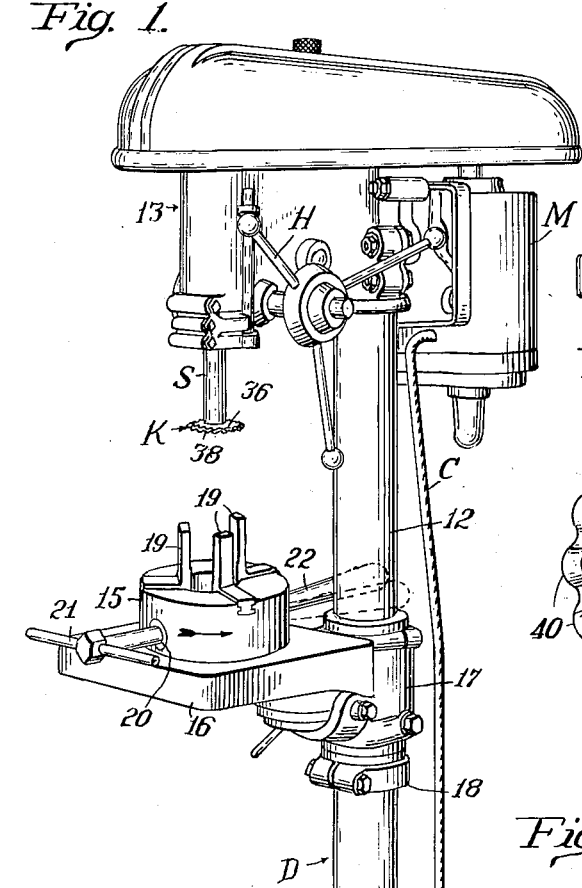
INVENTOR
Walter Bailey
BY
ATTORNEYS Feb. 14, 1956  W. BAILEY  2,734,573
MACHINE FOR CUTTING OFF THE END TURNS OF THE
COILS OF ELECTRICAL MACHINE ELEMENTS
Filed Oct. 5, 1951  2 Sheets-Sheet 2
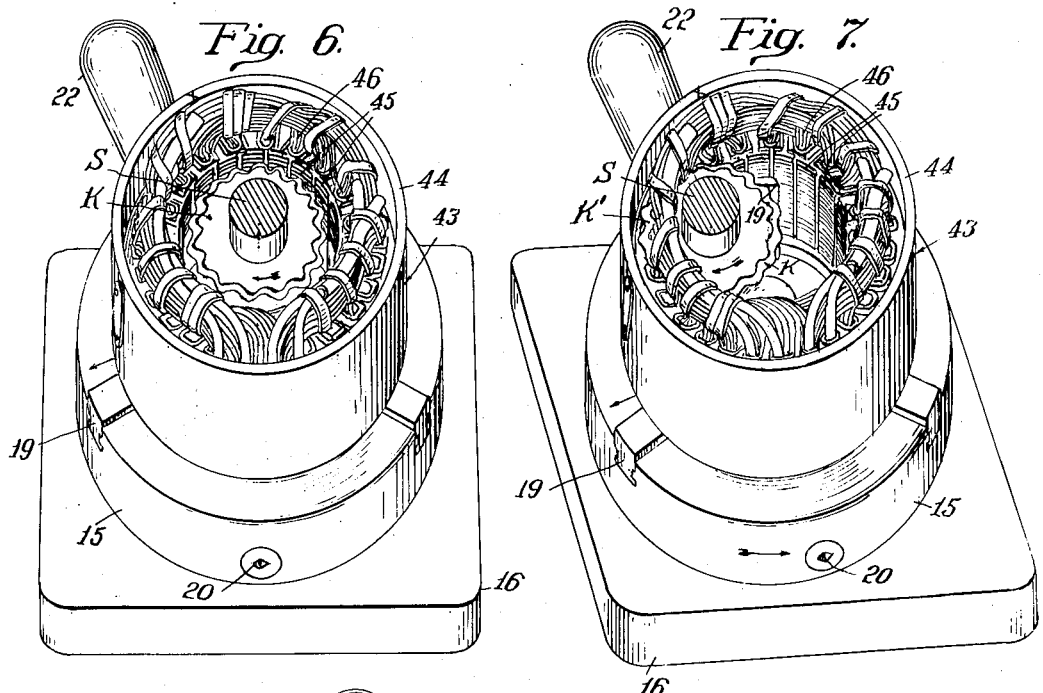
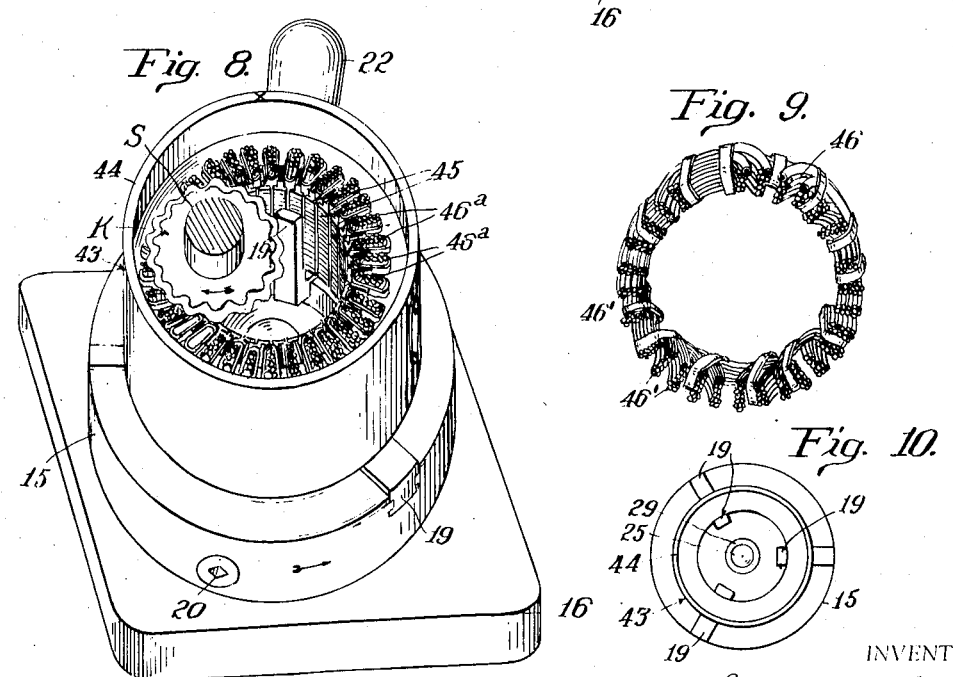
INVENTOR
Walter Bailey
BY Shoemaker & Mattare
ATTORNEYS

United States Patent Office 2,734,573
Patented Feb. 14, 1956

2,734,573

MACHINE FOR CUTTING OFF THE END TURNS OF THE COILS OF ELECTRICAL MACHINE ELEMENTS

Walter Bailey, Silver Spring, Md., assignor of one-third to Edward A. Camp and one-third to Henry J. Dorr, Washington, D. C.

Application October 5, 1951, Serial No. 250,002

5 Claims. (Cl. 164—60)

This invention relates to a method of and a machine for cutting off the end turns of the coils of electrical machine elements such as the stators and armatures of motors, generators and the like, to enable ready removal of the remaining portions of the coils from the usual slots in the machine elements in which they are disposed. The general purpose involved is, of course, to strip the machine elements of burnt-out or otherwise damaged coils preparatory to providing them with new coils.

In removing burnt-out or otherwise damaged coils from stators, armatures and the like, it is the usual practice to cut off the end turns of the coils in order to permit the remaining portions of the coils readily to be pulled from the usual slots in the stators, armatures or the like in which they are disposed. In this connection, the common practice heretofore has been to cut off the end turns of the coils by means of hand-operated tools such as cold chisels, wire cutters and the like. This not only is time-consuming and therefore expensive, but usually results in such distortion of the cut ends of the remaining portions of the coils as to render it difficult to remove the said remaining portions from the slots in which they are disposed. Moreover, the laminations of the machine elements frequently are damaged and in many instances are left with burrs which may rupture the insulation of new coils applied to the elements.

Accordingly, the object of the present invention is to provide a simple, practical method and a simple, practical machine for cutting off the end turns of the coils of stators, armatures, and the like rapidly and cleanly, whereby the aforementioned disadvantages inherent to cutting off the end turns by cold chisels and other hand-operated tools are substantially completely avoided.

With the foregoing and other objects in view as will become more fully apparent as the nature of the invention is better understood, the same consists in a method of and a machine for the purpose stated which embody the novel steps and the novel features of construction, combination and arrangement of parts, respectively, as are illustrated by way of example in the accompanying drawings and as will be hereinafter more fully described and claimed.

In the drawings:

Figure 1 is a view in perspective of a machine embodying the features of the invention;

Figure 2 is a side elevational view partly in section showing the chuck for holding the stator or armature;

Figure 3 is a view in perspective showing the novel disk type cutter;

Figure 4 is an enlarged view partly in section showing the end of the spindle with the cutter mounted or positioned thereon;

Figure 5 is an enlarged sectional view of a portion of the cutter and showing one of the scallops in elevation taken on the line 5—5 of Figure 3 looking in the direction of the arrows;

Figure 6 is a view in perspective looking down on the chucked stator and showing the cutter in its initial concentric relationship with the stator about to begin the cutting operation;

Figure 7 is a view similar to Figure 6, but showing the chuck and its supporting table moved so that the cutter has taken its initial radial cut through the end turns of the coils of the stator;

Figure 8 is a view similar to Figure 7 wherein the chuck has been rotated relative to the cutter and the complete end turns of the coils have been cut off from the remaining portions thereof;

Figure 9 is a view in perspective showing the end turns of the coils that have been completely cut off, these turns being in substantially their ring-like disposition and association; and Figure 10 is a diagrammatic illustration in top plan showing the jaws of the chuck gripping or holding the stator.

The invention will be more readily understood by referring to the drawings in detail wherein like reference characters throughout the several views, denote the same component parts or elements.

The machine illustrated is designated generally as D and comprises a base 11, a column 12 rising from said base, a head 13 carried by said column at or near the upper end thereof, and a table 16 mounted on said column between said base and said head by means of collars 17 and 18 for vertical adjustments and lateral swinging movements relative to said column.

Carried by and depending from the head 13 is a vertical spindle S which is vertically adjustable relative to said head by a handle H and which carries at its lower end a suitable cutter designated generally as K.

Mounted on the head 13 is an electric motor M which is suitably connected to the spindle S for driving the same and which is under the control of a foot-operated switch 14 to which it is connected by a cord C.

Mounted on the table 16 for rotation relative thereto about a vertical axis is a chuck 15 which includes radially movable jaws 19 rising therefrom to grip and hold either a stator or an armature in a vertically disposed position above said table. The chuck 15 may be of conventional construction and its jaws 19 may be moved radially to grip a stator or rotor by means of a suitable wrench 21 engageable with an element 20 of the chuck. Carried by the chuck is a handle 22 by means of which the chuck may be rotated to rotate a stator or armature held thereby about its own axis. The chuck 15 is provided with a central opening 23 and there is a bearing 29 disposed in this opening. A smooth upstanding pin 25 is secured substantially centrally to the table 16. This pin has a lower reduced exteriorly screw threaded portion 26 which extends through an opening 27 in the table 16 complemental in diameter therewith and said pin is affixed or secured to the table by means of a nut 28 which engages the screw threads 26. The bearing 29 in the chuck 15 embraces the smooth pin 25, and when the handle 22 is moved, the chuck as a whole revolves about this pin.

As aforesaid, the spindle S is operatively connected with the motor M so as to be rotated by the motor. The end portion 30 of the spindle, as seen in Figure 4, has a centrally disposed interiorly screw threaded recess 31 therein and the extreme end portion thereof is reduced and is of polygonal outline or shape. The disk-like cutter generally denoted at K has a central polygonal-shaped opening 32 therein which conforms with the polygonal projecting end of the spindle, and this opening fits over the reduced polygonal-shaped end of the spindle. An immediately adjacent surrounding portion of the disk abuts or contacts the spindle, and preferably the thickness of the disk cutter and the depth of the reduced end portion are substantially the same so that the outside surface of the end of the spindle is flush with the flat outer face of the cutter as shown in Figure 4. The cutter K is maintained on the end of the spindle by means of a large headed bolt 33, the head of which is of greater diameter than the opening 32 in the cutter and the screw threaded portion 34 of which bolt engages the interior screw threads in the recess 31 of the spindle. The bolt may be slotted as at 35 to enable it to be secured in place by a screw driver or the like, or the bolt could have a polygonal head thereon to be turned by a wrench. In selecting the bolt as a securing means for the cutter, the head of the same should not be of any undue thickness and the diameter of this head is preferably not larger than the diameter of the spindle so that the head of the bolt will not interfere with the work in the cutting operation.

The unique cutter K is disk-like and its outer face 37 and its inner face 36 are smooth. The peripheral edge 38 of the cutter is scalloped or undulated substantially uniformly throughout. This scalloped edge 38 of the cutter, as will be seen from Figures 3, 4 and 5, has quite a substantial bevel or incline, as denoted at 39. The peaks 40 of the undulations or scalloped edge and the valleys 41, which successively alternate throughout the bevels of the cutter, are as aforesaid, substantially uniform and both the peaks and the valleys are substantially uniformly beveled on the inner peripheral surface edge only, whereas the outer peripheral face portion 42 of the scalloped or undulated edge is smooth and in the same plane with the remaining portion of this face of the cutter. In other words, the inclined undulated or scalloped peripheral edge is only at the periphery at the inner face of the cutter and the opposite portion of that scalloped and beveled edge is, as aforesaid, smooth.

The described construction of the cutter K is of importance because it adapts said cutter to cut off the end turns of coils cleanly and rapidly, thus enabling ready removal of the remaining portions of the coils from the slots in a stator or armature in which they are disposed.

Just as an example of one diameter of the cutter which has proved satisfactory in cutting the end turns of coils, while being driven at about 1700 R. P. M. by a ½ hp. motor, such cutter as utilized being substantially 3½ inches in diameter, 1/16 inch thick and which beveled, scalloped edge is at an 18° angle in respect to either face 36 or 37 of the cutter, resulted in effectively severing the end turns of the coils in a matter of seconds. Obviously, different diameter cutters for larger stators and armatures may be used. In the cutting disk illustrated, there are shown 18 ridges or scallops and, of course, the corresponding number of valleys. Of course, the beveled, scalloped edge of the cutter is substantially smooth throughout.

There is now described the way in which the machine is utilized to cut off the end turns of the coils of a stator. The stator is denoted generally at 43 and is conventional and includes the outer casing or shell 44 that is cylindrical and within which there is positioned the usual laminations 45 with the spaces therebetween wherein the medial portions of the coils are disposed. As is well known, at both ends of the stator, the coils 46 thereof project beyond the ends of the laminations. When the coils of the stator are damaged and need replacement, one of the aforesaid projecting ends of the coils must be cut off in order that the remaining portion of the coils within the stator can be removed therefrom.

The stator 43 is positioned on the chuck 15 so that the upstanding jaws 19 of the chuck project interiorly and longitudinally of the laminations thereof. The wrench or tool 21 is manipulated so as to expand these jaws 19 into firm gripping contact relationship at equidistant points on the laminations as shown in Figure 10, one of such jaws in its gripping and holding relationship being shown in Figure 8. With the stator chucked, the hand wheel H is operated so as to lower the spindle S and to dispose the cutter K within the stator as shown in Figure 6, and the spindle carrying the cutter is locked in the position shown in this figure of the drawing. By depressing the foot operated switch 14, the motor M effects rotation of the spindle S and, of course, the cutter that is carried thereby. The table 16 which carries the chuck 15 then is swung laterally as, for example, from the position shown in Figure 6 to the position shown in Figure 7 to cause the rotating cutter K to take a radial cut completely through the adjacent end turns of the coils. With the table in the position shown in Figure 7, the operator, by grasping the handle 22, rotates the chuck on the table 16 from the position shown in Figure 7 to the position shown in Figure 8 in a counterclockwise movement, and thus, after the initial cut has been made, as shown in Figure 7, the entire remaining upper end turns of the coils are completely cut and severed, as shown in Figure 8, with the ring-like upper end of these coils 46 completely displaced from the remaining portions of the coils. An examination of the cut ends 46' of the end turns of the coils 46 shows that these ends are cut cleanly and without being displaced, distorted or entangled in any manner whatsoever, and likewise, the cut ends 46a that remain in the stator, see Figure 8, are also clean cut and not displaced with respect to the passages in which they are disposed, nor are they entangled in any manner whatsoever.

As will be obvious, either the cutter K may be adjusted longitudinally relative to the table 16, or said table may be adjusted longitudinally relative to said cutter, to properly position said cutter longitudinally relative to the end turns of the coils of a stator or armature of any given length held by the chuck 15. As also will be obvious, either the cutter K or the table 16 may be moved laterally to cause said cutter K to make its initial substantially radial cut through the end turns of the coils. Obviously, too, either the chuck 15 may be rotated, or the cutter K may be moved in a circular or orbital path, to effect annular cutting of the end turns of the coils. In other words, relative planetary movement between the cutter K and the end turns of the coils to cause annular cutting of the end turns of the coils may be effected either by rotating the chuck and, hence, the coils to cause the end turns of the coils to travel in an annular, or orbital, path relative to said cutter, or by moving said cutter in an annular, or orbital, path relative to the end turns of the coils.

When the aforesaid cutting off of the end turns of the coils has been completed, then by any simple pulling device or mechanism, the other projecting ends of the coils are grasped while the stator is held fast and the remainder of the coils within the stator or armature, as the case may be, are thus readily withdrawn from within the slots in the laminations. No form of the pulling device or mechanism for withdrawing the remainder of the coils from between these laminations is described but any such devices as are usually found in a shop for repairing motors and the like may be utilized. All that is necessary is that the pulling device include some means to grasp the remaining projecting end turns of the coils so that by holding the stator or armature stationary, the pulling device can be manipulated to readily withdraw, in a unitary condition, the coils that remain in the stator or armature.

There is no limitation as regards the size of the stators and armatures that are applicable to the cut-off machine of my invention. The machine and the novel cutter perform equally as well with respect to both small and large stators and armatures.

What I claim is:

1. A machine for cutting off the end turns of a stator comprising a base, a column upwardly extending from said base, a vertical movable rotatable spindle supported by said column, an electric motor interconnected with said spindle for rotating the same, a laterally swingable chuck support mounted on said column below said spindle, a manually rotatable chuck carried by said support, a disk-like cutter carried by said spindle and adapted when the stator is chucked, to be moved within the stator with its peripheral edge adjacent the end turns of the coils of the stator so that lateral swinging of the support results in the said cutter, while rotating, effecting a radial cut outwardly into and through a portion of the end turns of the coils, and rotation of the chuck with the stator thereon results in the severance of the remaining portions of the coils of the stator.

2. A machine for cutting off the end turns of the coils of electrical machine elements such as stators and armatures to enable ready removal of the remaining portions of the coils from the usual slots in the elements in which they are disposed, said machine comprising a chuck for holding an electrical machine element containing coils the end turns of which are to be cut off, a rotary cutter, power means connected to said cutter for rotating the same about its own axis, the axes of said chuck and said cutter extending in like directions, said chuck and said cutter being spaced apart axially, means mounting said chuck and said cutter for axial movements of variable amounts relative to each other and for lateral movement relative to each other to enable positioning of the cutter in a plane intersecting the end turns of the coils of electrical machine elements of different lengths held by the chuck and substantially radial cutting of said end turns, and other means mounting said chuck and said cutter for planetary movements relative to each other to enable the cutter to traverse and cut the end turns of the coils annularly.

3. A machine as set forth in claim 2 in which the chuck is mounted for rotation about its own axis to enable a machine element held thereby to be rotated relative to the cutter.

4. A machine for cutting off the end turns of the coils of electrical machine elements such as stators and armatures to enable ready removal of the remaining portions of the coils from the usual slots in the elements in which they are disposed, said machine comprising a column, a head mounted on said column, a table mounted on said column for rotation relative thereto, a spindle carried by said head and disposed parallel to said column and extending from said head toward said table, a disk-like cutter carried by said spindle and disposed in a plane at right angles thereto, power means connected to said spindle for rotating the same and thereby rotating said cutter about their common axis, and a chuck mounted on said table for rotation relative thereto about an axis extending parallel to said column, said chuck being operable to hold an electrical machine element containing coils, the end portions of which are to be cut off, in a position coaxial with said chuck and, extending from said chuck toward said cutter so that by longitudinal and rotative movements of said table relative to said column the portions of the end turns of the coils to be cut may be brought into the plane of the cutter and be cut substantially radially by said cutter and so that by rotation of said chuck relative to said table the end turns of the coils may be cut annularly.

5. A machine for cutting off the end turns of the coils of electrical machine elements such as stators and armatures to enable ready removal of the remaining portions of the coils from the usual slots in the elements in which they are disposed, said machine comprising a base, a column rising from said base, a head on said column, a vertical spindle depending from said head, an electric motor mounted on said head and connected to said spindle for rotating the latter about its own axis, a disk-like cutter carried by said spindle and disposed in a plane at right angles thereto, a table mounted on said column for vertical adjustment therealong and for rotatable movement relative thereto, and a chuck carried by and extending upwardly from said table and operable to hold an electrical machine element with its axis disposed vertically so that by rotatable and longitudinal movements of said table relative to said column the portions of the end turns of the coils of said element to be cut may be brought into the plane of the cutter and be cut substantially radially by the cutter, said chuck being mounted on said table for rotation relative thereto about its own axis to enable the end turns of the coils to be traversed annularly relative to said cutter and annularly cut by said cutter.

References Cited in the file of this patent

UNITED STATES PATENTS

| | | |
|---|---|---|
| 1,559,680 | Denne | Nov. 3, 1925 |
| 1,741,711 | Pearson | Dec. 31, 1929 |
| 1,813,340 | Conti | July 7, 1931 |
| 1,891,749 | Conti | Dec. 20, 1932 |
| 1,983,642 | Shuey | Dec. 11, 1934 |
| 2,465,058 | Burkett | Mar. 22, 1949 |
| 2,630,613 | Webb | Mar. 10, 1953 |
| 2,662,289 | Giffen | Dec. 15, 1953 |